(12) United States Patent
Vilenskiy et al.

(10) Patent No.: US 12,272,851 B2
(45) Date of Patent: Apr. 8, 2025

(54) ROTARY-TYPE DATA TRANSMISSION DEVICE AND ELECTRONIC APPARATUS INCLUDING THE SAME

(71) Applicant: Samsung Electronics Co., Ltd., Suwon-si (KR)

(72) Inventors: Artem Rudolfovitch Vilenskiy, Moscow (RU); Mikhail Nikolaevich Makurin, Moscow region (RU); Chongmin Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 284 days.

(21) Appl. No.: 17/825,525

(22) Filed: May 26, 2022

(65) Prior Publication Data

US 2022/0336936 A1    Oct. 20, 2022

Related U.S. Application Data

(63) Continuation of application No. PCT/KR2020/016837, filed on Nov. 25, 2020.

(30) Foreign Application Priority Data

Nov. 26, 2019   (RU) .......................... RU2019138217
Nov. 10, 2020   (KR) ......................... 10-2020-0149606

(51) Int. Cl.
   *H01P 1/06*      (2006.01)
   *H01P 3/12*      (2006.01)
   *H04B 7/26*      (2006.01)

(52) U.S. Cl.
   CPC .................. *H01P 1/06* (2013.01); *H01P 3/12* (2013.01); *H04B 7/26* (2013.01)

(58) Field of Classification Search
   CPC ................ H01P 1/06; H01P 3/12; H04B 7/26
   See application file for complete search history.

(56) References Cited

U.S. PATENT DOCUMENTS 5,442,329 A    8/1995   Ghosh et al.
7,592,887 B2   9/2009   Chao et al.
            (Continued)

FOREIGN PATENT DOCUMENTS

| CN | 002710216 Y | 7/2005 |
| KR | 10-2016-0127072 A | 11/2016 |
| RU | 2 481 689 C1 | 5/2013 |
| RU | 2 651 614 C1 | 4/2018 |
| RU | 2 696 676 C1 | 8/2019 |
| RU | 2 703 604 C1 | 10/2019 |

OTHER PUBLICATIONS

A low cost waveguide switch using glide symmetric holey electromagnetic band gap (Year: 2023).*

(Continued)

*Primary Examiner* — Andrea Lindgren Baltzell
*Assistant Examiner* — Kimberly E Glenn
(74) *Attorney, Agent, or Firm* — Jefferson IP Law, LLP

(57) ABSTRACT

A rotary-type data transmission device is provided. The rotary-type data transmission includes a first structure having a first surface and a second surface facing each other and including a first metal hollow waveguide including a first through hole passing through the second surface from the first surface in a center portion thereof, a second structure coupled to the first structure to support rotation of the first structure or to support rotation by the first structure, a first transceiver facing the first surface at a certain distance therebetween, coupled to the first structure, and including a first printed circuit board, a first meta waveguide, and a first transceiver, and a second transceiver facing the second surface at a certain distance therebetween, coupled to the second structure, and including a second printed circuit board, a second meta waveguide, and a second transceiver.

15 Claims, 24 Drawing Sheets

(56) References Cited

U.S. PATENT DOCUMENTS

| | | | |
|---|---|---|---|
| 8,417,075 B2* | 4/2013 | Violante | G02B 6/3604 |
| | | | 385/26 |
| 8,963,790 B2 | 2/2015 | Brown | |
| 9,100,056 B2 | 8/2015 | McCarthy et al. | |
| 9,358,684 B1 | 6/2016 | He et al. | |
| 9,413,049 B2 | 8/2016 | Wootan et al. | |
| 9,812,902 B2 | 11/2017 | Chernokalov et al. | |
| 9,866,272 B2 | 1/2018 | Okada | |
| 9,979,061 B1 | 5/2018 | Droz et al. | |
| 10,381,317 B2 | 8/2019 | Maaskant et al. | |
| 10,742,315 B1 | 8/2020 | Li et al. | |
| 11,075,436 B2* | 7/2021 | Vynohradov | H01P 1/182 |
| 2011/0181373 A1 | 7/2011 | Kildal | |
| 2012/0093041 A1 | 4/2012 | Takeda et al. | |
| 2013/0181791 A1 | 7/2013 | McCarthy et al. | |
| 2013/0183902 A1 | 7/2013 | McCarthy et al. | |
| 2015/0130565 A1 | 5/2015 | Henderson et al. | |
| 2016/0211701 A1 | 7/2016 | Krumme | |
| 2019/0123411 A1 | 4/2019 | Carlred et al. | |
| 2020/0185802 A1 | 6/2020 | Vilenskiy et al. | |

OTHER PUBLICATIONS

Panasonic Introduces People-Centric Robotics Technology at International Robot Exhibition 2017 https://news.panasonic.com/global/topics/2017/52853.html.

International Search Report dated Feb. 26, 2021, issued in International Application No. PCT/KR2020/016837.

Russian Search Report dated Apr. 14, 2020, issued in Russian Application No. 2019138217.

Decision on Grant dated Apr. 23, 2020, issued in Russian Application No. 2019138217.

WiGig: Multi-Gigabit Wireless Communications in the 60 GHz Band Applicable mm-wave communication standards: 5G (28 GHz), IEEE 802.11ad (60 GHz WiGig), IEEE Wireless Communications, Dec. 2011.

3rd Generation Partnership Project; Technical Specification Group Services and System Aspects; Release 15 Description; Summary of Rel-15 Work Items (Release 15), 3GPP TR 21.915 V15.0.0 IEEE 802.11ad (WiGiG) 57-64 GHz contactless data transmission system, Sep. 2019.

Korean Office Action Oct. 14, 2024, issued in the Korean Application No. 10-2020-0149606.

* cited by examiner

ROTARY-TYPE DATA TRANSMISSION DEVICE AND ELECTRONIC APPARATUS INCLUDING THE SAME

CROSS-REFERENCE TO RELATED APPLICATION(S)

This application is a continuation application, claiming priority under § 365(c), of an International application No. PCT/KR2020/016837, filed on Nov. 25, 2020, which is based on and claims the benefit of a Russian patent application number 2019138217, filed on Nov. 26, 2019, in the Russian Intellectual Property Office, and of a Korean patent application number 10-2020-0149606, filed on Nov. 10, 2020, in the Korean Intellectual Property Office, the disclosure of each of which is incorporated by reference herein in its entirety.

BACKGROUND

1. Field

The disclosure relates to a data transmission system for an apparatus including a rotary part. More particularly, the disclosure relates to a rotary-type data transmission device and an electronic apparatus including the same.

2. Description of Related Art

The rapid growth of robotics technology in recent years is based on an increasing demand for automation and robot complexes in various fields of human activity, such as the defense industry and the mining industry. Accordingly, it is necessary to develop a new structure for transmitting data through a robot part (joint) and an actuator of a robot complex (robot). This structure is particularly important for a rotary part, such as a rotary joint of a robot.

There are currently several methods of providing data transmission through a rotary joint.

Specifically, there is a method using a cable assembly for data transmission. In the cable assembly, a cable passes through a rotary joint. This operation has several disadvantages, such as a limited rotation range of the rotary joint, low cable reliability due to torsional moment, and a high probability of cable damage during intense movement.

There is a method using a rotary contact (slip ring). This operation may not be suitable for high data rates (such as high definition (HD)-video), may cause interference due to an arc between contacts, and may degrade performance over time due to abrasion.

There is a method using a high-frequency rotary joint based on a split coaxial or circular waveguide. This operation is suitable only for a stationary structure because it uses a design with a great total metal volume.

As a known related-art operation disclosed in Patent Document US 2015/0130565 A1, there is a rotary joint based on two rectangular metal waveguides coupled through a coaxial transmission line. This operation has a design with a great total metal volume and is not suitable for a joint of a small robot.

U.S. Pat. No. 8,963,790 B2 discloses a three-axis rotary joint based on a circular waveguide. However, this operation has a very bulky design that is not suitable for a robot joint.

U.S. Pat. No. 9,358,684 B1 discloses a wireless transmission apparatus for use in a robot arm, which includes a rotary unit including a first coil and a second coil arranged to be coaxially rotatable. However, this transmission apparatus is not suitable for a high data rate due to a low-frequency data transmission mechanism.

The operation disclosed in Patent Document US 2013/0181791 A1 is a waveguide structure for a contactless connector. The contactless connector includes a first communication chip configured to transmit or receive a wireless radio frequency (RF) signal, a second communication chip configured to transmit or receive a wireless RF signal, and a waveguide structure between the first and second communication chips. However, this operation is based on a bulky metal waveguide and is not suitable for a joint of a small robot.

Therefore, the operation of the related-art has a disadvantage, such as low reliability, a low data rate through a rotary joint, and/or a great limitation in use for a small mobile robot due to a great total volume and weight of a metal waveguide used for guiding signals to/from the rotary joint.

Therefore, a need exists for a small, reliable, simple, and inexpensive system that provides a high data rate through a rotary robot joint.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a rotary-type data transmission device and an electronic apparatus including the same.

Additional aspects will be set forth in part in the description which follows and, in part, will be apparent from the description, or may be learned by practice of the presented embodiments.

In accordance with an aspect of the disclosure, a rotary-type data transmission device is provided. The rotary type data transmission device includes a first structure having a first surface and a second surface facing each other the first structure including a first metal hollow waveguide including a first through hole passing through the second surface from the first surface in a center portion thereof, a second structure coupled to the first structure so that the second structure supports rotation of the first structure or rotation of the second structure is supported by the first structure, a first transceiver facing the first surface at a certain distance therebetween, coupled to the first structure, the first transceiver including a first printed circuit board, a first meta waveguide, and a first transceiver, and a second transceiver facing the second surface at a certain distance therebetween, coupled to the second structure, the second transceiver including a second printed circuit board, a second meta waveguide, and a second transceiver.

A rotation axis on which the first structure or the second structure rotates may be aligned with a center axis of the first metal hollow waveguide.

The first meta waveguide, the first metal hollow waveguide, and the second meta waveguide may form a contactless data transmission path between the first transceiver and the second transceiver.

The first meta waveguide may be arranged on a surface facing the first structure among both surfaces of the first printed circuit board, and the first transceiver may be arranged on the other surface of the first printed circuit board.

A transmission/reception path between the first transceiver and the first meta waveguide may be formed by a signal line including a conductive via passing through the first printed circuit board.

The second meta waveguide may be arranged on a surface facing the first structure among both surfaces of the second printed circuit board, and the second transceiver may be arranged on the other surface of the second printed circuit board.

A transmission/reception path between the second transceiver and the second meta waveguide may be formed by a signal line including a conductive via passing through the second printed circuit board.

The first structure may also function as a ground layer with respect to each of the first meta waveguide and the second meta waveguide.

The first structure may include a first metal flange portion protruding from the second surface toward the second structure and the first through hole of the first metal hollow waveguide may extend through the first metal flange portion, the second structure may include a second metal flange portion protruding toward the first structure, wherein a second through hole passing through the second structure and the second metal flange portion may be provided to form a second metal hollow waveguide, and the first metal hollow waveguide and the second metal hollow waveguide may be flange-coupled free of contact.

A groove may be formed in at least one of the first metal flange and the second metal flange.

The first structure may function as a ground layer with respect to the first meta waveguide, and the second structure may function as a ground layer with respect to the second meta waveguide.

At least one of the first meta waveguide and the second meta waveguide may include a ridge gap waveguide including a conductive ridge and a plurality of electromagnetic bandgap structures surrounding the conductive ridge.

The ridge gap waveguide may include a plurality of equiphase branches extending from the first transceiver or the second transceiver and intersecting in a junction area between the first metal hollow waveguide and the ridge gap waveguide.

The plurality of equiphase branches may have a symmetrical configuration to excite a TM01 mode in the first metal hollow waveguide.

The plurality of equiphase branches may be galvanically connected in the junction area.

The plurality of equiphase branches may be galvanically isolated in the junction area.

The electromagnetic bandgap structure may include a conductive pad located on an outermost surface of the first printed circuit board or the second printed circuit board, and a via-type base extending from the conductive pad to an internal ground layer of the first printed circuit board or the second printed circuit board.

The first metal hollow waveguide may include an impedance transformer for impedance matching with the first meta waveguide and/or the second meta waveguide.

Any one of the first transceiver and the second transceiver may be connected to an antenna module.

According to an aspect, an electronic apparatus includes any one of the rotary-type data transmission devices described above.

The above rotary-type data transmission device may ensure a high data transmission rate, may have a reduced weight and size, and may have an increased reliability.

The above rotary-type data transmission device may be used in various electronic apparatuses such as robot joints that rotate and require a data transmission function.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the terms "over" or "on" may include not only "directly over" or "directly on" but also "indirectly over" or "indirectly on".

As used herein, the singular forms "a", "an", and "the" are intended to include the plural forms as well, unless the context clearly indicates otherwise. In addition, when something is referred to as "including" a component, another component may be further included unless specified otherwise.

The use of the terms "a", "an", and "the" may be construed to cover both the singular and the plural.

Figure 1:
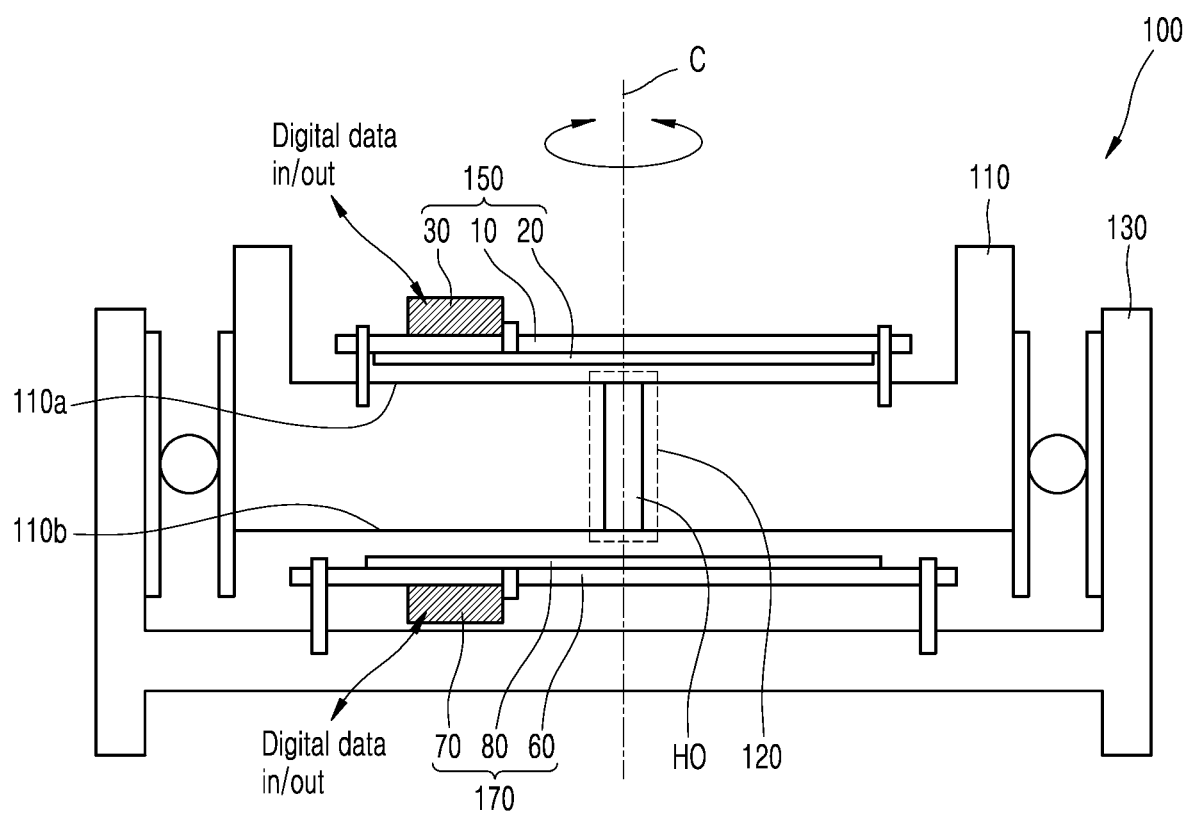
FIG. 1 is a cross-sectional view illustrating a schematic structure of a rotary-type data transmission device according to an embodiment of the disclosure.

FIG. 1 is a cross-sectional view illustrating a schematic structure of a rotary-type data transmission device according to an embodiment of the disclosure.

Referring to FIG. 1, a rotary-type data transmission device 100 may include a first structure 110 to which a first transceiver unit 150 is coupled and a second structure 130 to which a second transceiver unit 170 is coupled. The first structure 110 or the second structure 130 may rotate on a rotation axis C. One of the first structure 110 and the second structure 130 may be a fixed portion, and the other may be a movable portion. For example, the first structure 110 may be fixed to support rotation of the second structure 130, or the second structure 130 may be fixed to support rotation of the first structure 110.

The first transceiver unit 150 coupled to the first structure 110 and the second transceiver unit 170 coupled to the second structure 130 may transmit data from a portion of the rotary-type data transmission device 100 to another portion or may receive data. For example, from the viewpoint of data transmission, one of the first transceiver unit 150 and the second transceiver unit 170 may be a transmitter unit, and the other may be a receiver unit. During operation, the data transmission direction may change repeatedly.

The first structure 110 may have a first surface 110a and a second surface 110b facing each other and may include a metal hollow waveguide 120 including a through hole HO passing through the second surface 110b from the first surface 110a at a center portion thereof. A center axis of the metal hollow waveguide 120 may be aligned with the rotation axis C. The through hole HO may have a cylindrical shape. At least a partial area of the first structure 110, that is, an area around the through hole HO, may include a metal material.

The first transceiver unit 150 may be coupled to the first structure 110 while facing the first surface 110a of the first structure 110 at a certain distance therebetween. Therefore, the first transceiver unit 150 may be fixed or driven together with the first structure 110. The first transceiver unit 150 may include a first printed circuit board 10, a first meta waveguide 20, and a first transceiver 30. The first transceiver unit 150 may have a structure based on a multilayer printed circuit board, and the structure may be coupled to the first structure 110 by a spacer 4. The spacer 4 may include a screw. However, the disclosure is not limited thereto, and a fastener providing a certain air gap between the first structure 110 and the first transceiver unit 150 and capable of coupling the first structure 110 and the first transceiver unit 150 to each other may be used instead of a screw.

The second structure 130 may be coupled to the first structure 110 so that the second structure 130 supports rotation of the first structure 110 or rotation of the second structure 130 is supported by the first structure 110.

The second transceiver unit 170 may be coupled to the second structure 130 while facing the second surface 110b of the first structure 110 at a certain distance therebetween. Therefore, the second transceiver unit 170 may be fixed or driven together with the second structure 130. The second transceiver unit 170 may include a second printed circuit board 60, a second meta waveguide 80, and a second transceiver 70. The second transceiver unit 170 may have a structure based on a multilayer printed circuit board, and the structure may be coupled to the second structure 130 by a spacer 8. The spacer 8 may include a screw. However, the disclosure is not limited thereto, and a fastener providing a certain air gap between the second structure 130 and the second transceiver unit 170 and capable of coupling the second structure 130 and the second transceiver unit 170 to each other may be used instead of a screw.

The first meta waveguide 20 and the second meta waveguide 80 may be a contactless waveguide including an electromagnetic bandgap (EBG) structure. For example, it may refer to a waveguide in which propagation of an electromagnetic wave signal in a particular frequency range is impossible due to an EBG structure despite the gap between a printed circuit board and a base metal constituting a waveguide.

The first structure 110 and the second structure 130 may be coupled by using a ball bearing 9, thereby ensuring drivability with respect to each other. The ball bearing 9 may be replaced by any other suitable type of bearing or any other element ensuring a relative position within a given range with the possibility of rotation with respect to each other.

The rotary-type data transmission device 100 according to an embodiment may transmit data through millimeter wave propagation and may transmit/receive data by using a meta waveguide. For a millimeter wavelength band, it may provide a data rate of up to several Gbit/s while maintaining a small waveguide size. However, this is merely an example, and in another embodiment of the disclosure, another suitable wavelength range may be used for signal transmission according to a required data transmission rate.

The first meta waveguide 20, the metal hollow waveguide 120, and the second meta waveguide 80 may provide a contactless data transmission path between the first transceiver 30 and a second transceiver 70. This structure may mean that the rotary-type data transmission device 100 may be rotated 360 degrees without impairing signal transmission performance. In addition, this structure may not require shielding and thus may reduce the weight and material consumption of the entire system structure.

Next, the structure and operation of the first transceiver unit 150 and the second transceiver unit 170 will be described with reference to FIGS. 2A, 2B, 3, 4A to 4C, 5A, 5B, 6A, and 6B. Hereinafter, the second transceiver unit 170 will be described as an example; however, this may also be applied to the structure and operation of the first transceiver unit 150. The first transceiver unit 150 and the second transceiver unit 170 may have a difference in the relative position relationship with respect to the first structure 110, that is, the description of the second transceiver 70, the second meta waveguide 80, and the second printed circuit board 60 may be applied to the description of the first transceiver 30, the first meta waveguide 20, and the first printed circuit board 10.

Figure 2A:
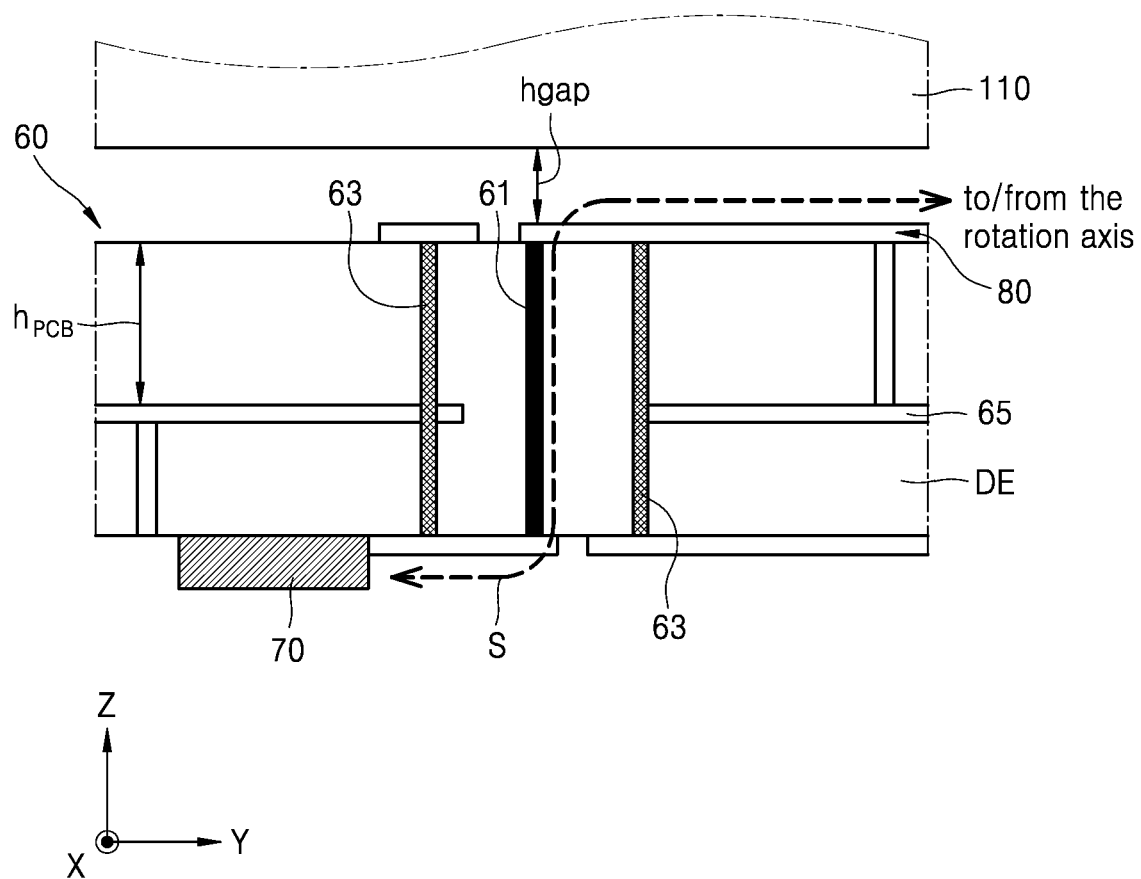
FIGS. 2A and 2B are a cross-sectional view and a plan view illustrating an enlarged detail of a partial area of a printed circuit board where a transceiver is located in a rotary-type data transmission device of FIG. 1 according to various embodiments of the disclosure.
Figure 2B:
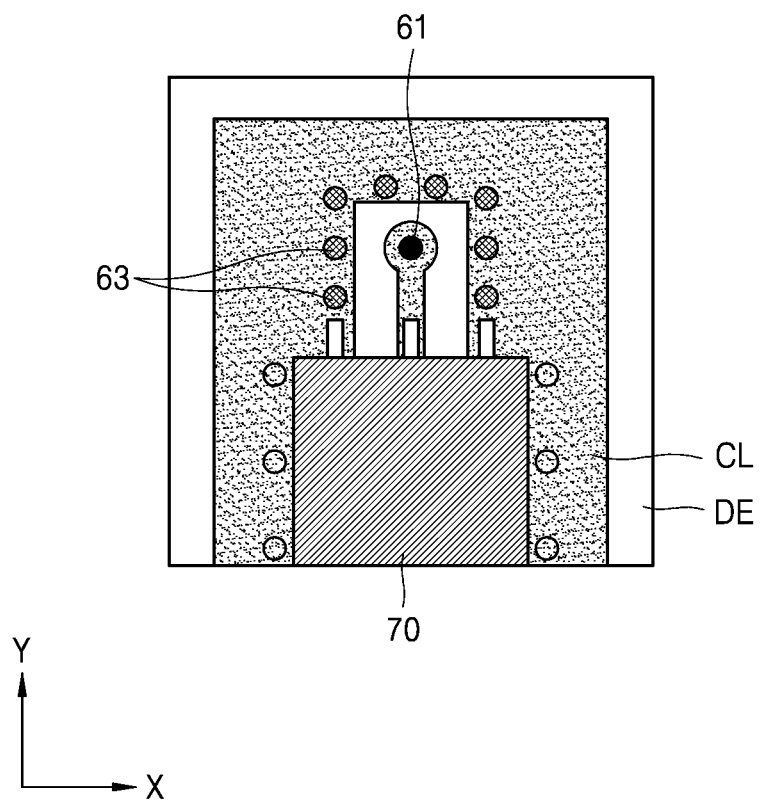

FIGS. 2A and 2B are a cross-sectional view and a plan view illustrating an enlarged detail of a partial area of a printed circuit board where a transceiver is located in the rotary-type data transmission device of FIG. 1 according to various embodiments of the disclosure.

Referring to FIGS. 2A and 2B, the second printed circuit board 60 may be a dielectric plate which includes several layers each having a thickness $h_{PCB}$ and in which electrically conductive circuits constituting an electronic circuit are formed on the surface and/or in the volume. The second printed circuit board 60 may include a dielectric (DE) and a plurality of metal layers and conductive vias formed inside and on upper and lower surfaces of the dielectric DE. The second printed circuit board 60 may be separated from the first structure 110 by an air gap having a height $h_{gap}$.

The second meta waveguide 80 may be arranged on a surface facing the first structure 110 among both surfaces of the second printed circuit board 60, that is, top and bottom surfaces, and the second transceiver 70 may be arranged on the other surface.

The second transceiver 70 may be configured to transmit/receive data, and a signal from the second transceiver 70 may be transmitted to the second meta waveguide 80 located on the uppermost layer of the second printed circuit board 60, through a signal line 61 including a conductive via. An internal ground layer 65 may be arranged in the second printed circuit board 60, and the internal ground layer 65 may have a shape including an annular gap. The signal line 61 may pass through a window in the internal ground layer 65, that is, an annular gap included in the internal ground layer 65, and may pass through the second printed circuit board 60.

A plurality of ground vias 63 may be provided near the signal line 61. The plurality of ground vias 63 may include a ground plated conductive via, thereby blocking an electromagnetic field within a limited volume. The plurality of ground vias 63 may be arranged very densely at an interval of about half the wavelength transmitted by the signal line 61 and may block an electromagnetic field from propagating to an area surrounded by the plurality of ground vias 63.

The internal ground layer 65 may separate an area where the second transceiver 70 is arranged from an area where the EBG structure included in the second meta waveguide 80 is located. This may reduce the height of the dielectric DE of the second printed circuit board 60 on the transceiver side, thus having an effect on the miniaturization of the design and preventing spurious radiation. A layer height $h_{PCB}$ of the dielectric DE may be determined by the presence of a forbidden zone of the EBG structure and may be about a ¼ wavelength. Here, the wavelength may refer to a center wavelength of the wavelength band of the wave transmitted/received by the rotary-type data transmission device 100, which is applied hereinafter unless otherwise stated.

FIG. 2B is a bottom view of a partial area of the second printed circuit board 60. As illustrated in FIG. 2B, the second transceiver 70 may be connected to a grounded coplanar line (CL) connected to the signal line 61 for transmitting a signal to the second meta waveguide 80 located on the uppermost layer of the second printed circuit board 60. In another embodiment of the disclosure, a micro stripline may be used instead of a grounded coplanar line.

Figure 3:
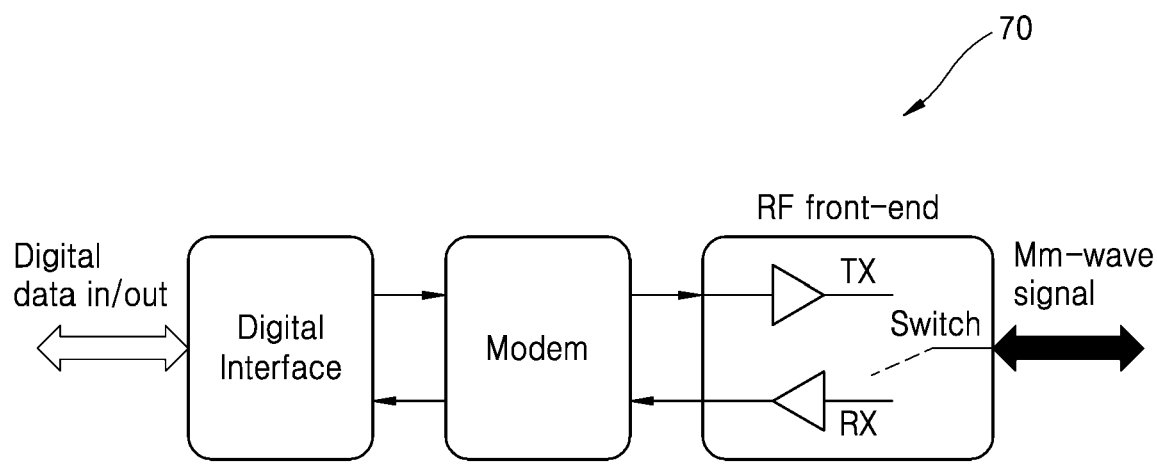
FIG. 3 illustrates a block diagram of a transceiver used in a rotary-type data transmission device according to an embodiment of the disclosure.

FIG. 3 illustrates a block diagram of a transceiver used in a rotary-type data transmission device according to an embodiment of the disclosure.

Referring to FIG. 3, the second transceiver 70 may include a digital interface for exchanging digital data to be transmitted, a modem for converting digital data of signals in a millimeter wave range to be transmitted/received, and an external RF interface (RF front end) configured to receive and transmit waves in the millimeter wave range.

Figure 4A:
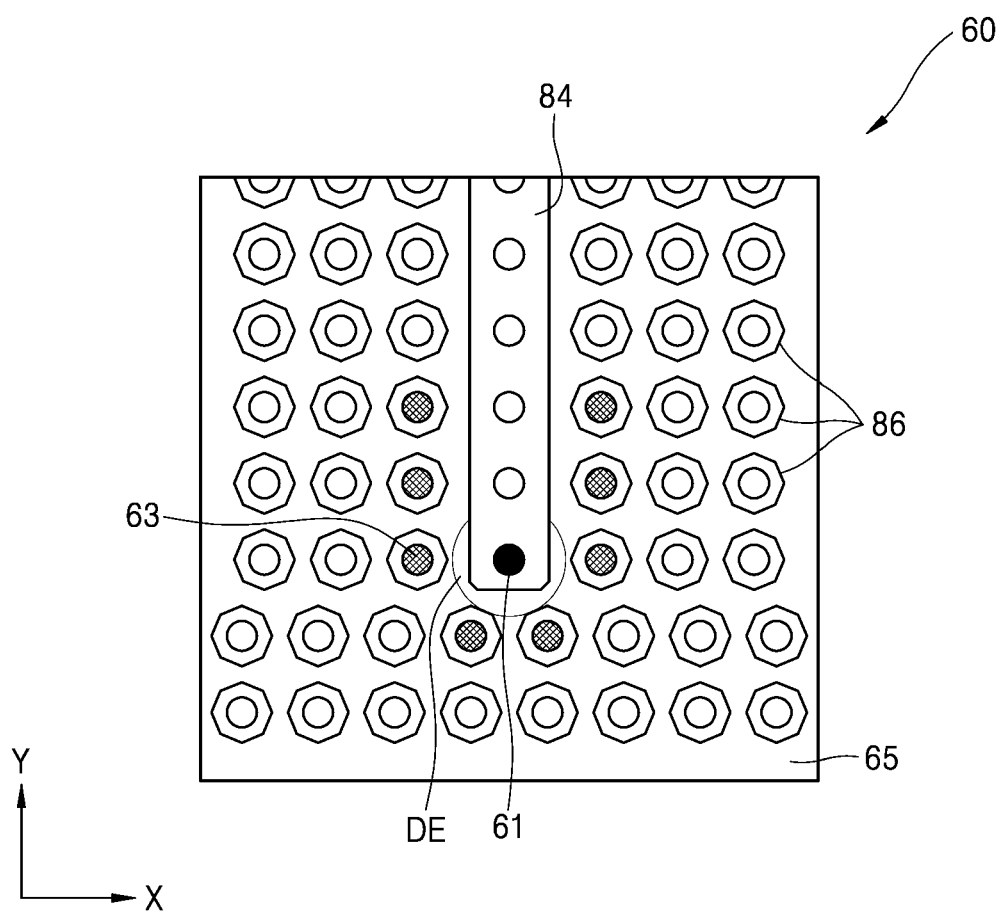
FIGS. 4A and 4B are a plan view and a cross-sectional view illustrating an enlarged detail of a partial area of a printed circuit board where a meta waveguide is located in a rotary-type data transmission device of FIG. 1 according to various embodiments of the disclosure.
Figure 4B:
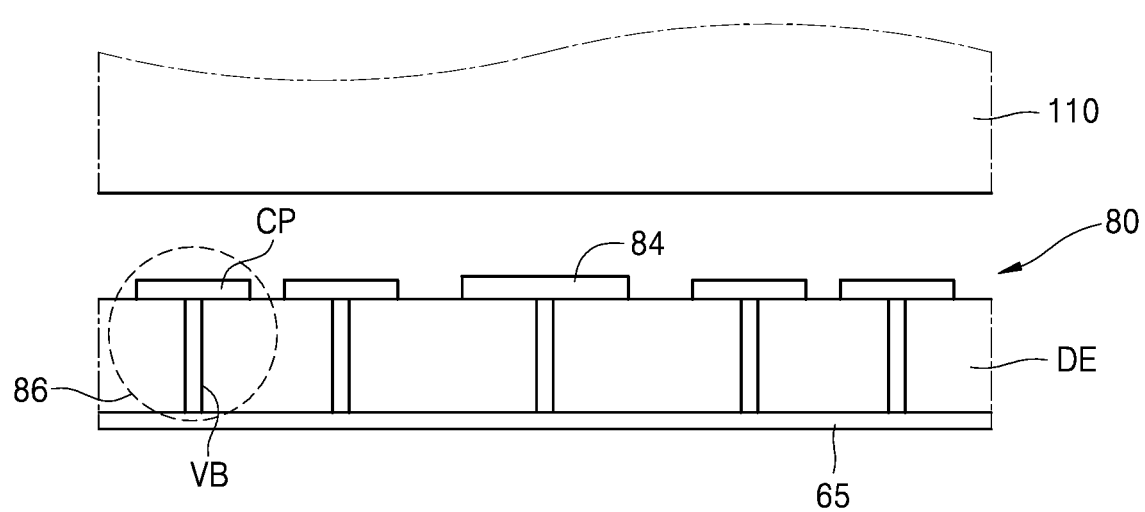
Figure 4C:
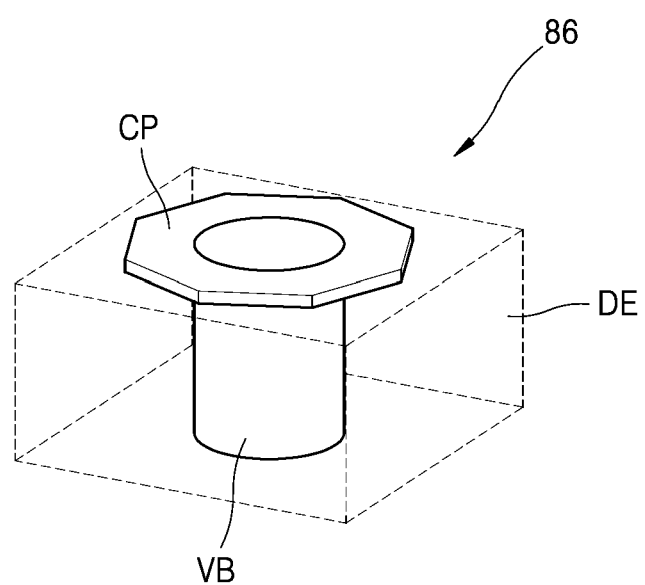
FIG. 4C is a perspective view illustrating a detailed shape of an electromagnetic bandgap structure illustrated in FIG. 4B according to an embodiment of the disclosure.

FIGS. 4A and 4B are a plan view and a cross-sectional view illustrating an enlarged detail of a partial area of a printed circuit board where a meta waveguide is located in a rotary-type data transmission device of FIG. 1 according to various embodiments of the disclosure. FIG. 4C is a perspective view illustrating a detailed shape of an electromagnetic bandgap structure illustrated in FIG. 4B according to an embodiment of the disclosure.

Referring to FIG. 4A, it illustrates an overlap of the top surface of the second printed circuit board 60 and the internal ground layer 65 having a shape including an annular gap in the second printed circuit board 60.

The second meta waveguide 80 may include a ridge gap waveguide including a conductive ridge 84 and a plurality of electromagnetic bandgap structures 86 surrounding the conductive ridge 84.

The conductive ridge 84 may protrude in a desired propagation direction to form a first ground layer of the second meta waveguide 80, and the first structure 110 arranged over the conductive ridge 84 with a certain air gap therebetween may function as a second ground layer of the second meta waveguide 80. A plurality of electromagnetic bandgap structures 86 surrounding the conductive ridge 84 in the area between two ground layers of the second meta waveguide 80 may be arranged to block the propagation (leakage) of an electromagnetic wave of a particular frequency from the second meta waveguide 80 to the surrounding environment.

The ridge gap waveguide may have a shape in which a plurality of conductive vias arranged at a distance from each other while passing through the first ground layer are interconnected through a print line on the surface of the second printed circuit board 60.

The signal through the signal line 61 may be transmitted from the second transceiver 70 and then propagated through the second meta waveguide 80 that is the ridge gap waveguide located on the uppermost layer of the second printed circuit board 60. As described above, the first structure 110 may function as the second ground layer of the second meta waveguide 80. This waveguide may be contactless and may not require the circuit closure between the second meta waveguide 80 and the second ground layer (i.e., the first structure 110). This may be ensured by the plurality of electromagnetic bandgap structures 86 that prevent an electromagnetic wave from propagating through a gap.

The first structure 110 may have a circular cross-sectional shape and may be located on the second meta waveguide 80 at a certain rotation angle in relation to the second structure 130. Therefore, the characteristics of signal transmission through the second meta waveguide 80 may not change at any position of the rotary-type data transmission device 100. This design may be small and light because it does not require an additional metal shield. By using a ridge gap waveguide structure as the second meta waveguide 80, a dissipative heat loss and a leakage radiation loss due to leaky waves may be significantly reduced. The waveguide loss according to the embodiment may be about 10 times lower than that of a micro strip or a coplanar line.

A plurality of electromagnetic bandgap structures 86 forming an electromagnetic bandgap may be arranged on both sides of the conductive ridge 84.

Referring to FIGS. 4B and 4C, the plurality of electromagnetic bandgap structures 86 may include a conductive pad (CP) located on the outermost surface of the second printed circuit board 60 and a via-type base VB extending from the conductive pad CP through the dielectric DE to the internal ground layer 65 of the second printed circuit board 60. The plurality of electromagnetic bandgap structures 86 may have a shape including a mushroom head-shaped conductive pad CP and a cylindrical mushroom leg-shaped via-type base VB. However, this is merely an example, and the conductive pad CP may have a cross-sectional shape, such as a circular shape, a square shape, a triangular shape, or a hexagonal shape. The size and shape of the conductive pad CP may affect the boundary of the forbidden zone and may be selected according to the requirements of a particular application field. In another embodiment of the disclosure, the electromagnetic bandgap structure may be manufactured from a metal material by milling, and the electromagnetic bandgap structure may be in the form of a simple column.

Because the distance between the plurality of electromagnetic bandgap structures 86 should be about an air gap, the ridge gap waveguide may have a compact geometry.

In another embodiment of the disclosure, as the second meta waveguide 80, a groove gap waveguide having no sidewall and including a plurality of electromagnetic bandgap structures may be used instead of the ridge gap waveguide.

Figure 5A:
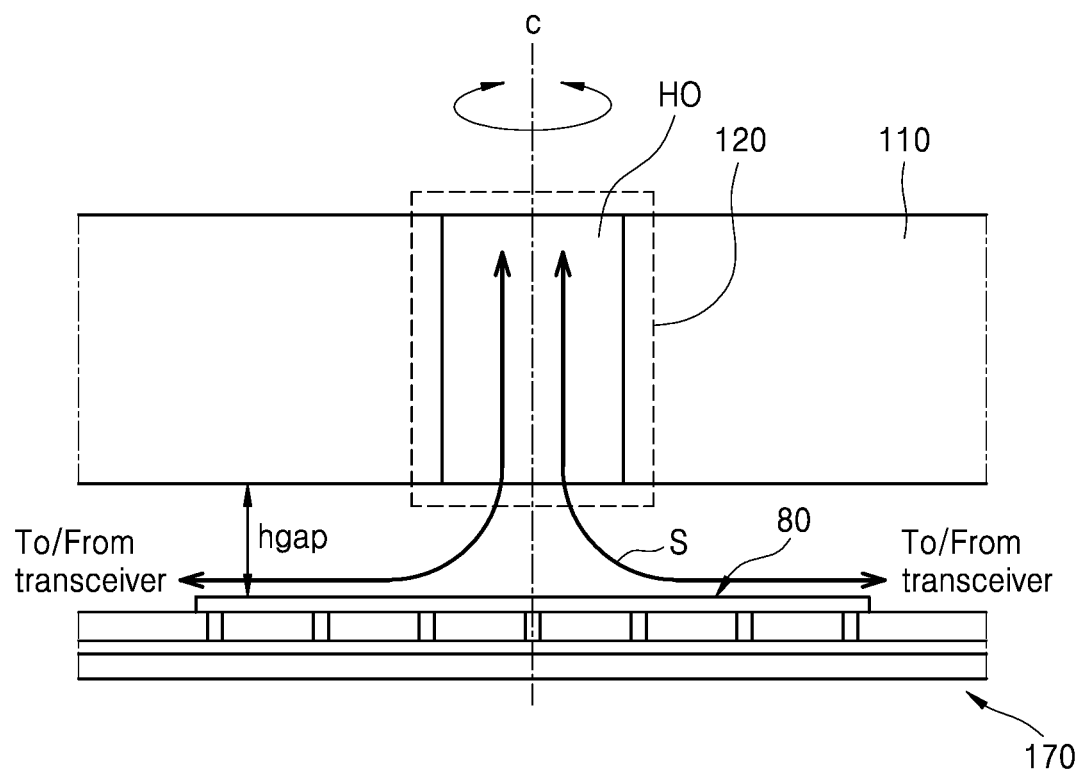
FIGS. 5A and 5B are a cross-sectional view and a plan view illustrating an arrangement relationship of a metal hollow waveguide and a meta waveguide by enlarging a partial area of a rotary-type data transmission device of FIG. 1 according to various embodiments of the disclosure.
Figure 5B:
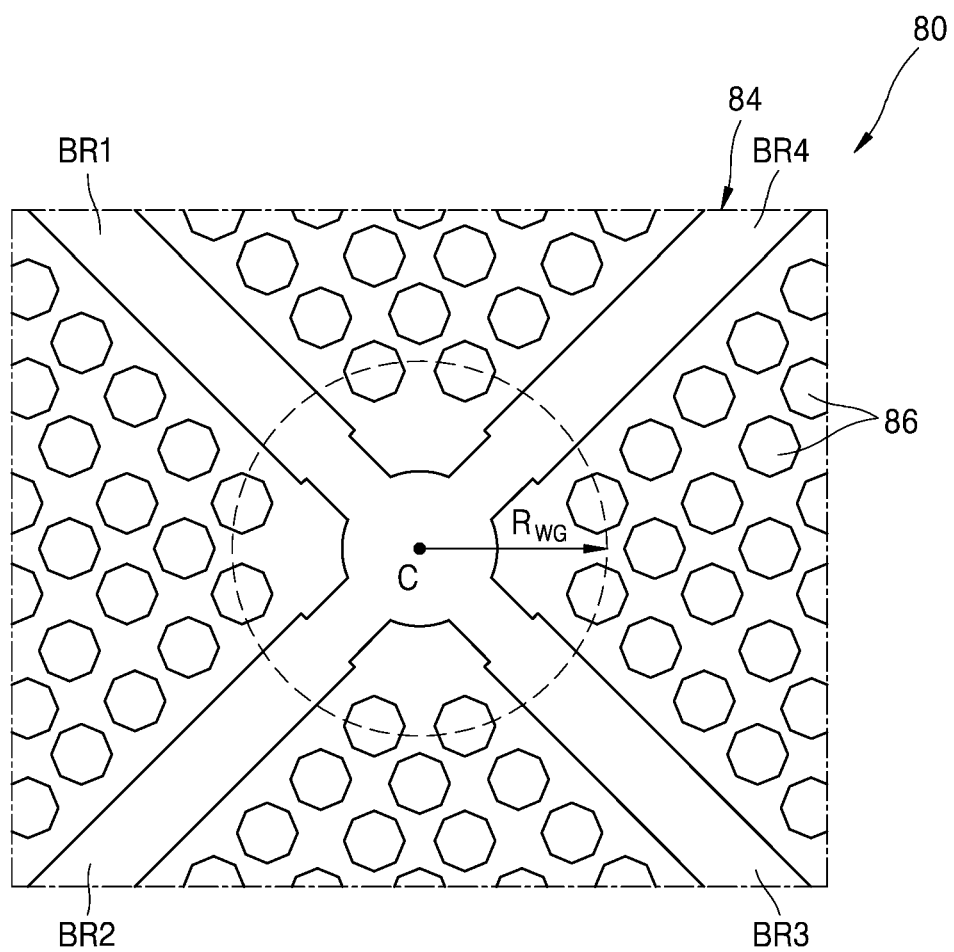
Figure 6A:
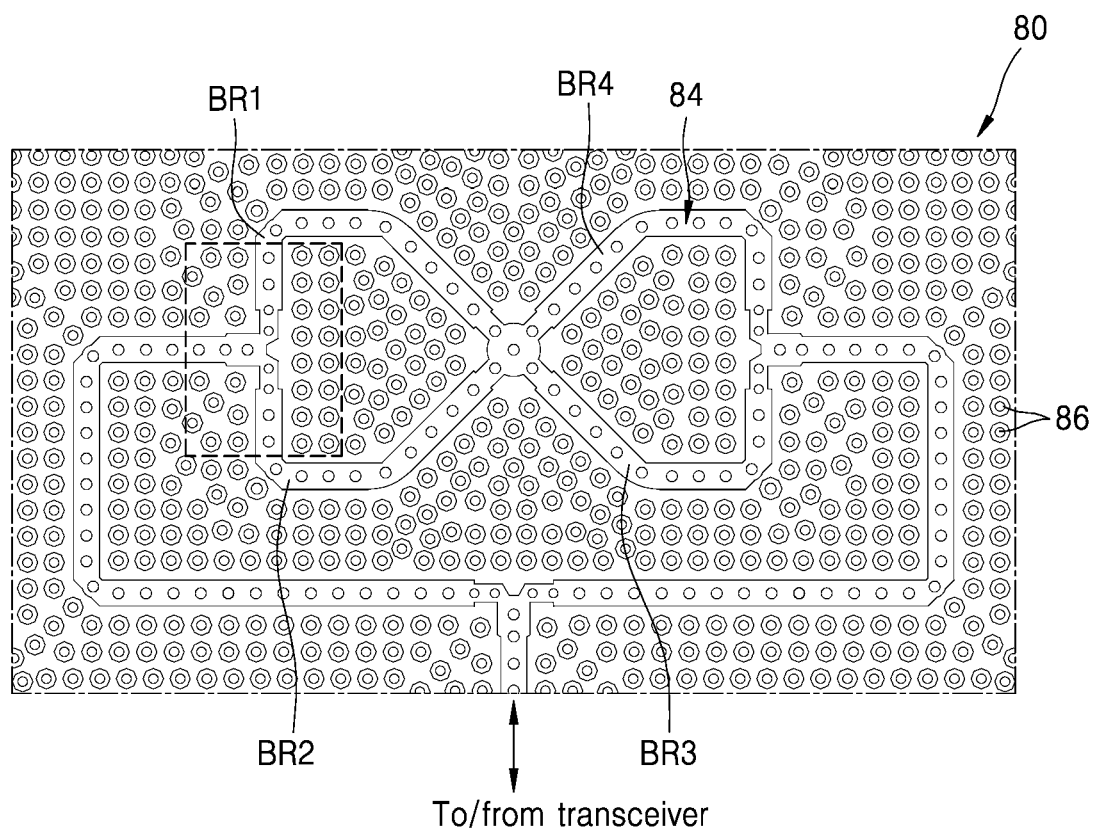
FIG. 6A is a plan view illustrating an entire shape of a meta waveguide included in a rotary-type data transmission device of FIG. 1 according to an embodiment of the disclosure.

FIGS. 5A and 5B are a cross-sectional view and a plan view illustrating an arrangement relationship of a metal hollow waveguide and a meta waveguide by enlarging a partial area of a rotary-type data transmission device of FIG. 1 according to various embodiments of the disclosure. FIG. 6A is a plan view illustrating an entire shape of a meta waveguide included in a rotary-type data transmission device of FIG. 1 according to an embodiment of the disclosure, and FIG. 6B is an enlarged view illustrating a partial area of FIG. 6A according to an embodiment of the disclosure.

Referring to FIG. 5A, it illustrates a junction area between the metal hollow waveguide 120 and the second meta waveguide 80 near the rotation axis C. A signal S of a millimeter wave band may be transmitted/received to/from the transceiver through the second meta waveguide 80 and may be transmitted to the metal hollow waveguide 120 through the junction area.

Referring to FIG. 5B, the junction area is indicated by a circle having a radius $R_{WG}$ of the metal hollow waveguide 120 with the rotation axis C as the center thereof. The conductive ridge 84 constituting the second meta waveguide 80 may include a plurality of branches intersecting in the junction area. The plurality of branches may have a symmetrical configuration to excite a TM01 mode in the metal hollow waveguide 120.

Figure 6B:
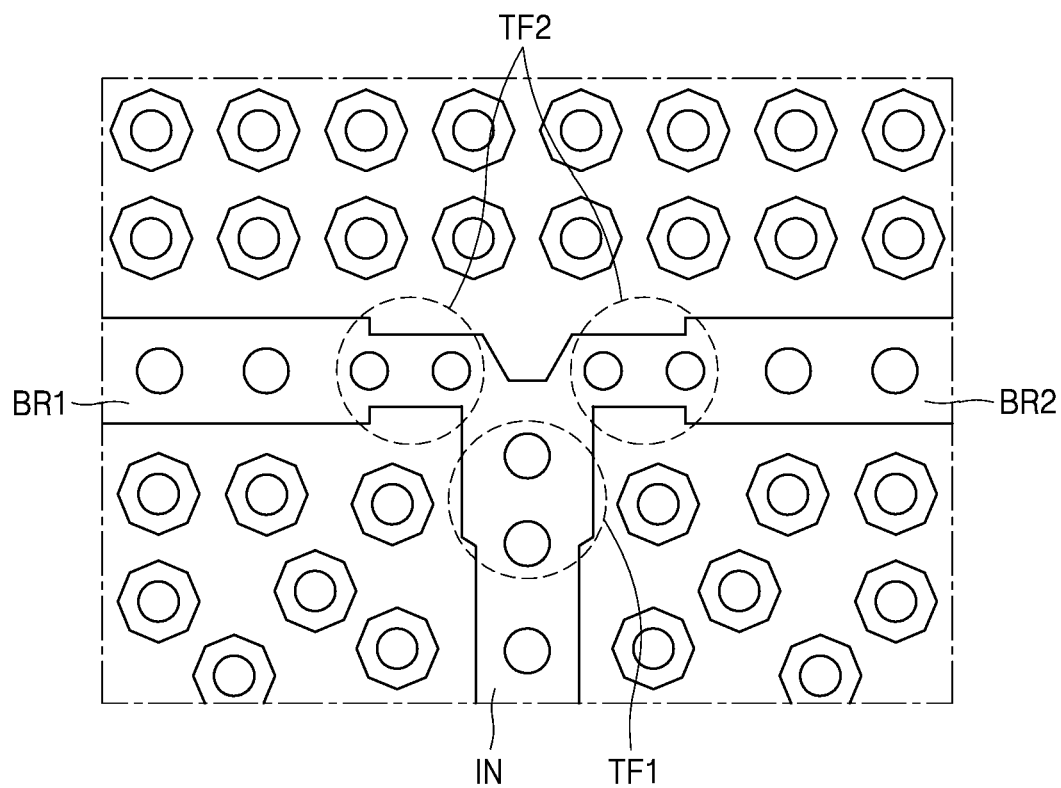
FIG. 6B is an enlarged view illustrating a partial area of FIG. 6A according to an embodiment of the disclosure.

Referring to FIGS. 6A and 6B, the plurality of branches may include four branches BR1, BR2, BR3, and BR4. The four branches BR1, BR2, BR3, and BR4 may be branched in equiphase and may be arranged with an angle difference of 90 degrees therebetween. The four branches BR1, BR2, BR3, and BR4 may be galvanically connected in the junction area. Any number of branches other than 4 may be used according to the design and other requirements. This symmetrical branch configuration may provide the excitation of the TM01 mode in the metal hollow waveguide 120 made in the first structure 110 and may allow a signal of the millimeter wave band to be transmitted through the first meta waveguide 20 toward the first printed circuit board 10 arranged over the first structure 110. Branches BR1 and BR2 include impedance transformers TF1 and TF2 facing the second meta waveguide 80. The signal transmission between the second meta waveguide 80 and the metal hollow waveguide 120 and between the metal hollow waveguide 120 and the first meta waveguide 20 may be contactless and may not require additional shielding. The signal leakage may be almost completely blocked by the plurality of electromagnetic bandgap structures 86.

Figure 7A:
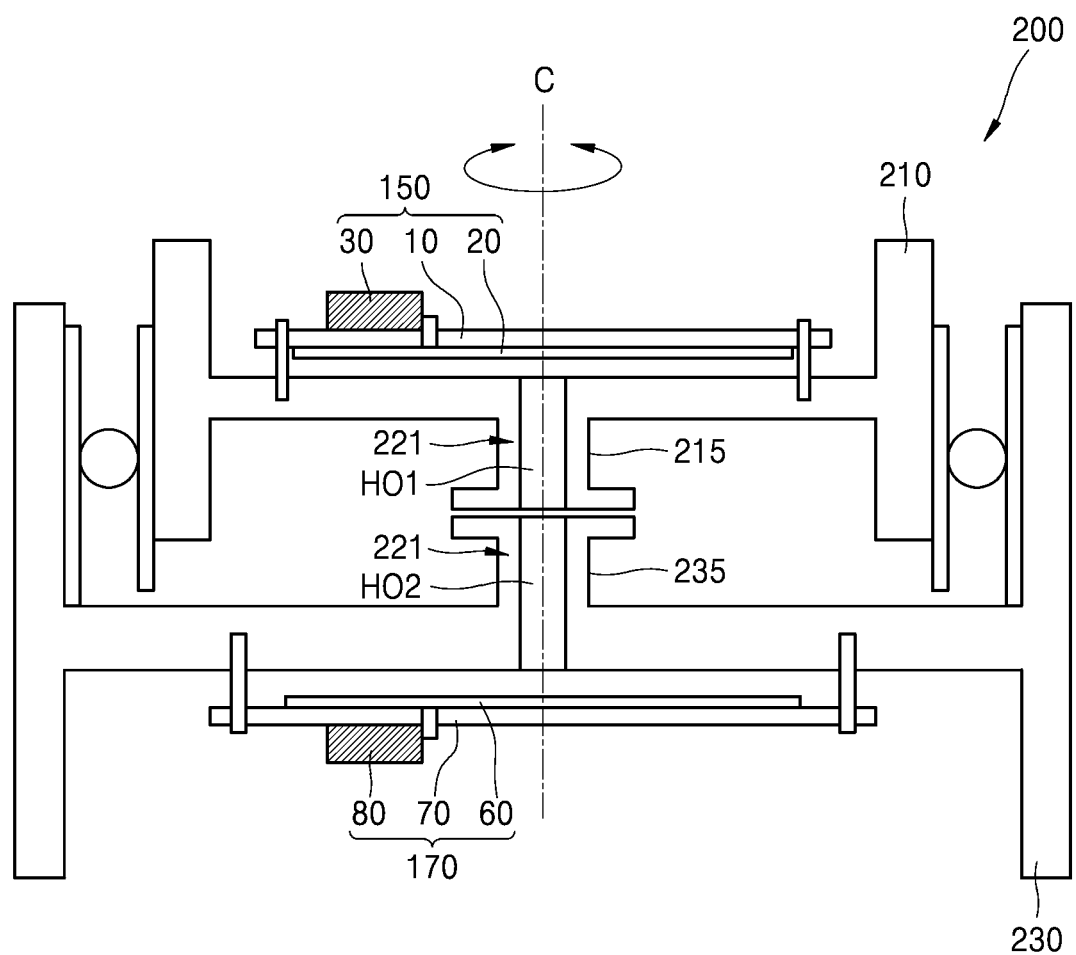
FIG. 7A is a cross-sectional view illustrating a schematic configuration of a rotary-type data transmission device according to an embodiment of the disclosure.
Figure 7B:
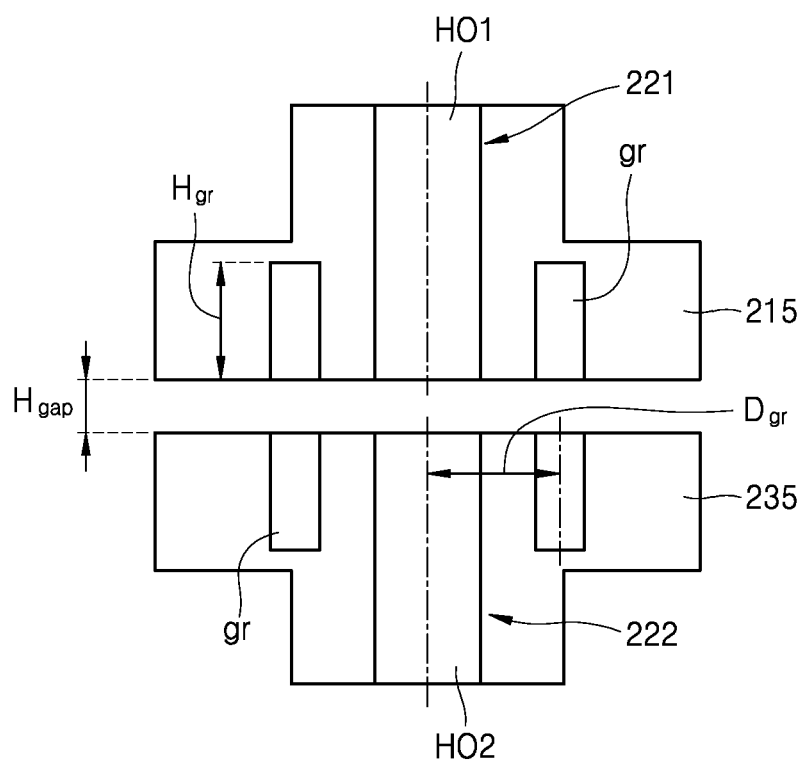
FIG. 7B is an enlarged view illustrating a partial area of FIG. 7A according to an embodiment of the disclosure.

FIG. 7A is a cross-sectional view illustrating a schematic configuration of a rotary-type data transmission device according to an embodiment of the disclosure, and FIG. 7B is an enlarged view illustrating a partial area of FIG. 7A according to an embodiment of the disclosure.

Referring to FIG. 7A, the gap height between a first metal flange portion 215 and the second metal flange portion 235 may be determined by the following Equation.

$$H_{gap} \leq \frac{\lambda_0}{2} \qquad \text{Equation 1}$$

Alternatively, a gap height $H_{gap}$ may satisfy the following condition.

$$H_{gap} \leq \frac{\lambda_0}{8} \qquad \text{Equation 2}$$

Here, $\lambda_0$ may be a center wavelength within an operating frequency range.

In order to prevent the loss due to signal leakage in the gap between a first metal flange 215 and a second metal flange 235, a groove gr may be provided in any one of the first metal flange 215 and the second metal flange 235. The number of grove gr illustrated in the drawings are merely examples. The groove gr may include a circular throttle groove. The height of the groove gr may be about ¼ of the center wavelength in the operating frequency range.

$$H_{gr} = \frac{\lambda_0}{4} \quad \text{Equation 3}$$

The distance from the center axis of HO1 and HO2 of a first or second metal hollow waveguide 221 or 222 to the center axis of the groove gr adjacent thereto may be about ¼ of the center wavelength of the operating wavelength range.

$$D_{gr} = \frac{\lambda_0}{4} \quad \text{Equation 4}$$

A rotary-type data transmission device 200 of the embodiment may present a design that reduces the total weight. In addition, additional elements (e.g., elements of a wireless power transmission system) may be arranged between a first structure 210 and a second structure 230.

Figure 8:
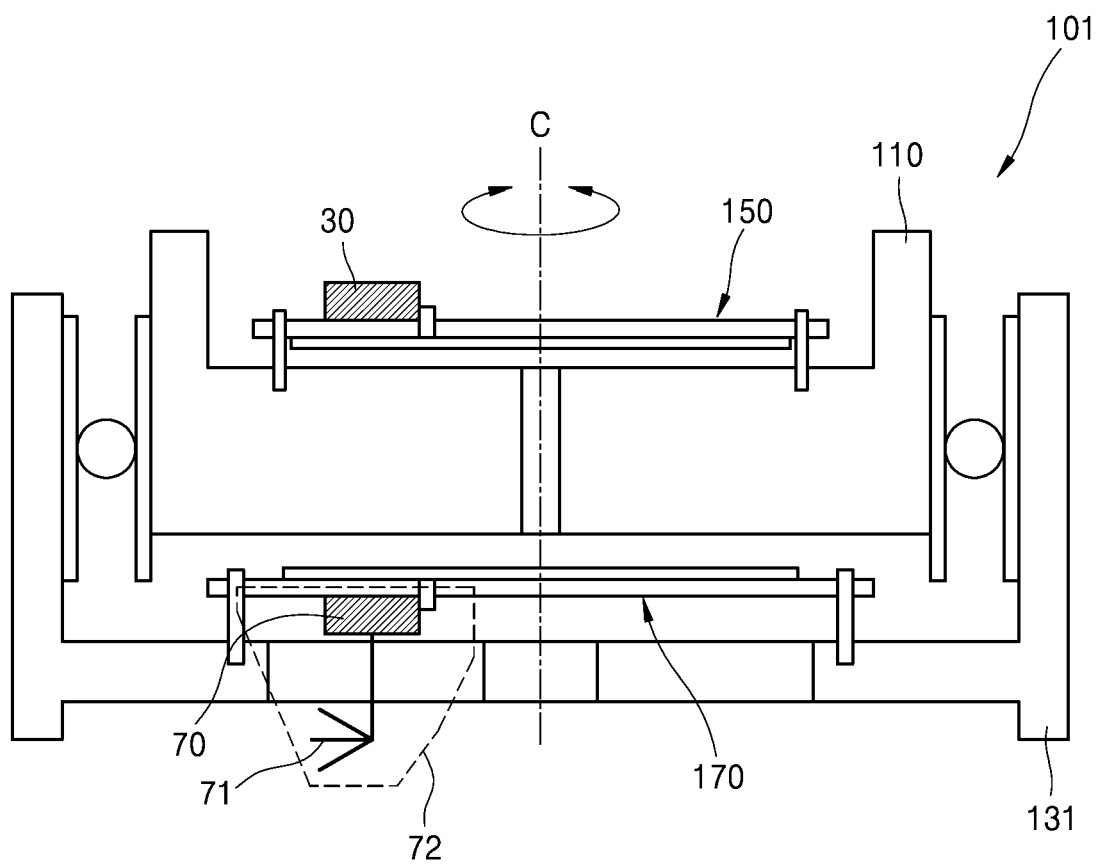
FIG. 8 is a cross-sectional view illustrating a schematic configuration of a rotary-type data transmission device according to an embodiment of the disclosure.
Figure 9:
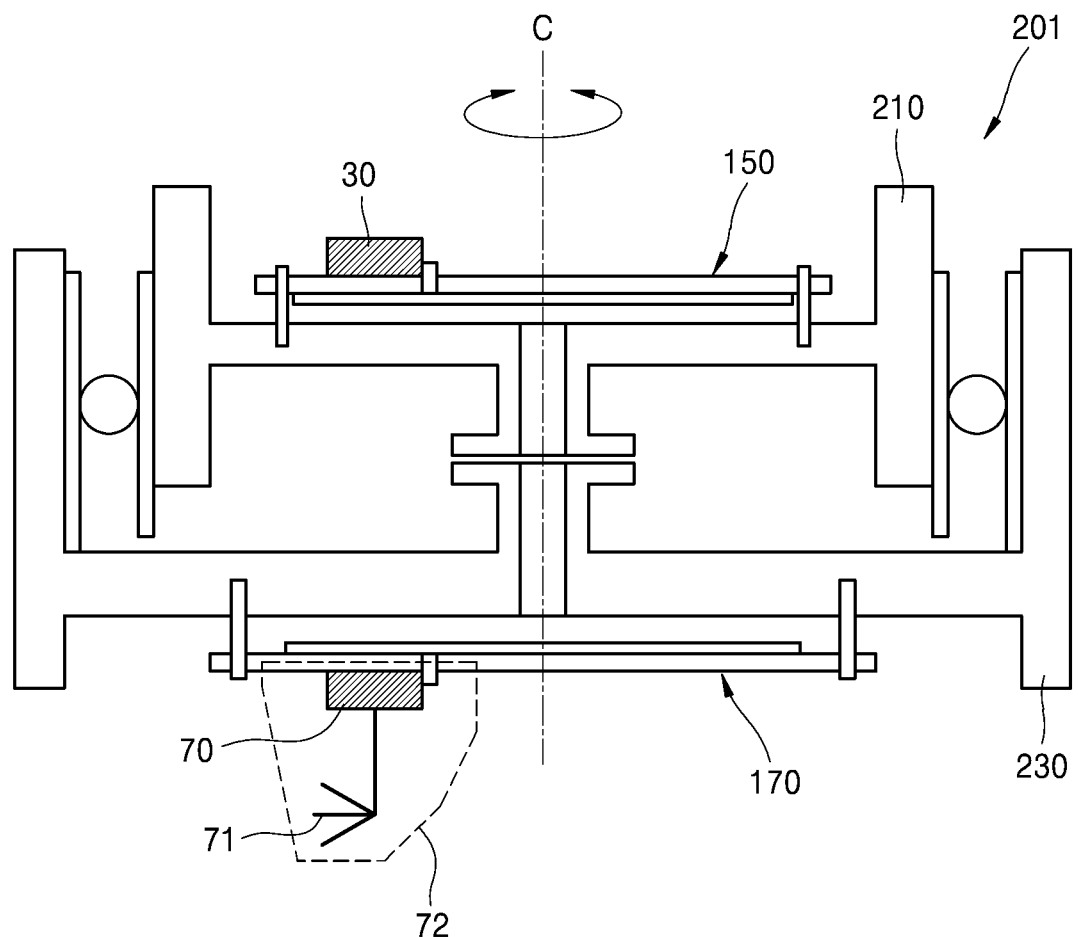
FIG. 9 is a cross-sectional view illustrating a schematic configuration of a rotary-type data transmission device according to an embodiment of the disclosure.

FIGS. 8 and 9 are each a cross-sectional view illustrating a schematic configuration of a rotary-type data transmission device according to various embodiments of the disclosure.

Referring to FIGS. 8 and 9, a rotary-type data transmission device 101 of FIG. 8 may be different from the rotary-type data transmission device 100 of FIG. 1 in that the second transceiver 70 is connected to an antenna module 71 to form a rotary antenna module 72. A certain hole may be provided in a second structure 131 for connection with the antenna module 71. The other components may be substantially the same as those of the rotary-type data transmission device 100 of FIG. 1.

The embodiment illustrates a case where the first structure 110 is a fixed portion and the second structure 131 is a movable portion, and the first transceiver 30 of the first transceiver unit 150 may be connected to the antenna module in another embodiment in which the first structure 110 is a movable portion and the second structure 131 is a fixed portion.

A rotary-type data transmission device 201 of FIG. 9 may be different from the rotary-type data transmission device 200 of FIG. 7A in that the second transceiver 70 is connected to an antenna module 71 to form a rotary antenna module 72, and the other components may be substantially the same as those of FIG. 7A.

The embodiment illustrates a case where the first structure 210 is a fixed portion and the second structure 230 is a movable portion, and the first transceiver 30 of the first transceiver unit 150 may be connected to the antenna module in another embodiment in which the first structure 210 is a movable portion and the second structure 230 is a fixed portion.

This structure may provide a compact, light, and reliable data transmission system for a rotary antenna system.

Figure 10:
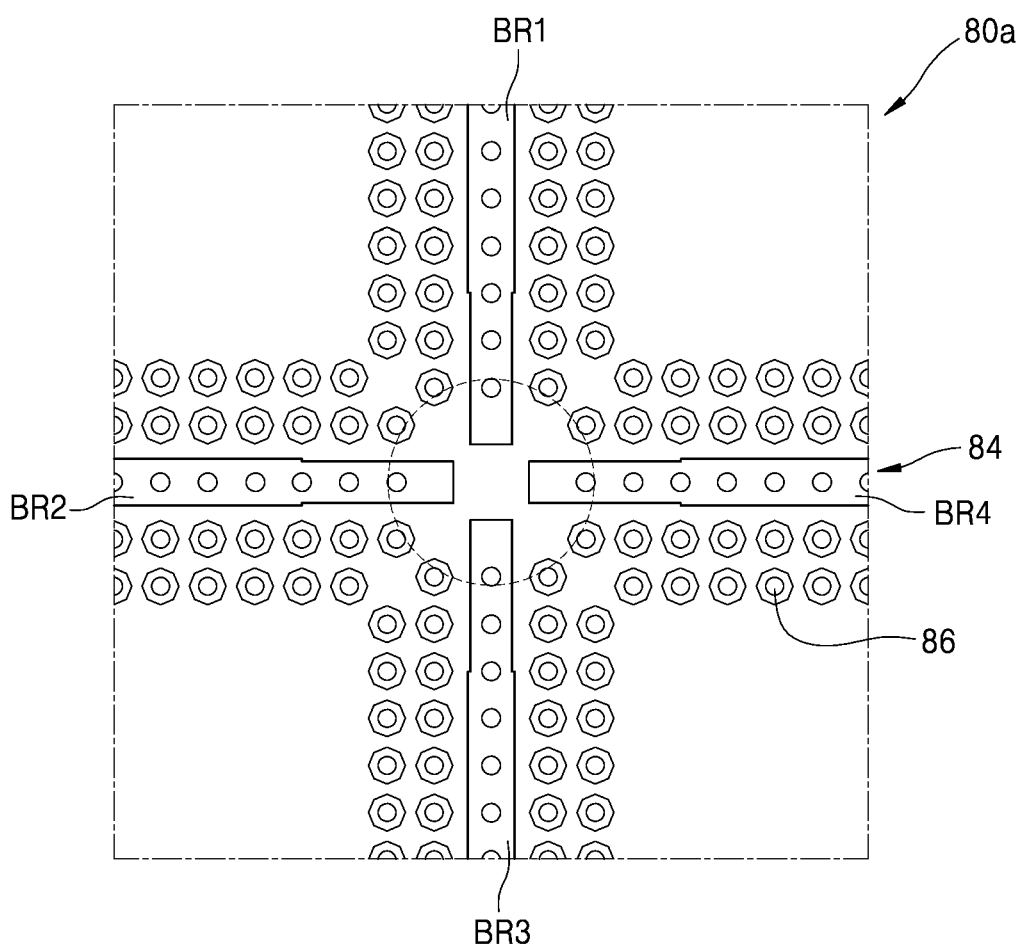
FIG. 10 is a plan view illustrating a symmetrical branch configuration of a meta waveguide included in a rotary-type data transmission device according to an embodiment of the disclosure.

FIG. 10 is a plan view illustrating a symmetrical branch configuration of a meta waveguide included in a rotary-type data transmission device according to an embodiment of the disclosure.

Referring to FIG. 10, a meta waveguide 80a may have a shape in which four branches BR1, BR2, BR3, and BR4 are not galvanically connected but galvanically isolated in a junction area facing a metal hollow waveguide.

The presence or shape of galvanic connection/isolation of a symmetrical branch configuration included in the meta waveguide may be suitably selected in relation to impedance matching with the facing metal hollow waveguide.

Figure 11:
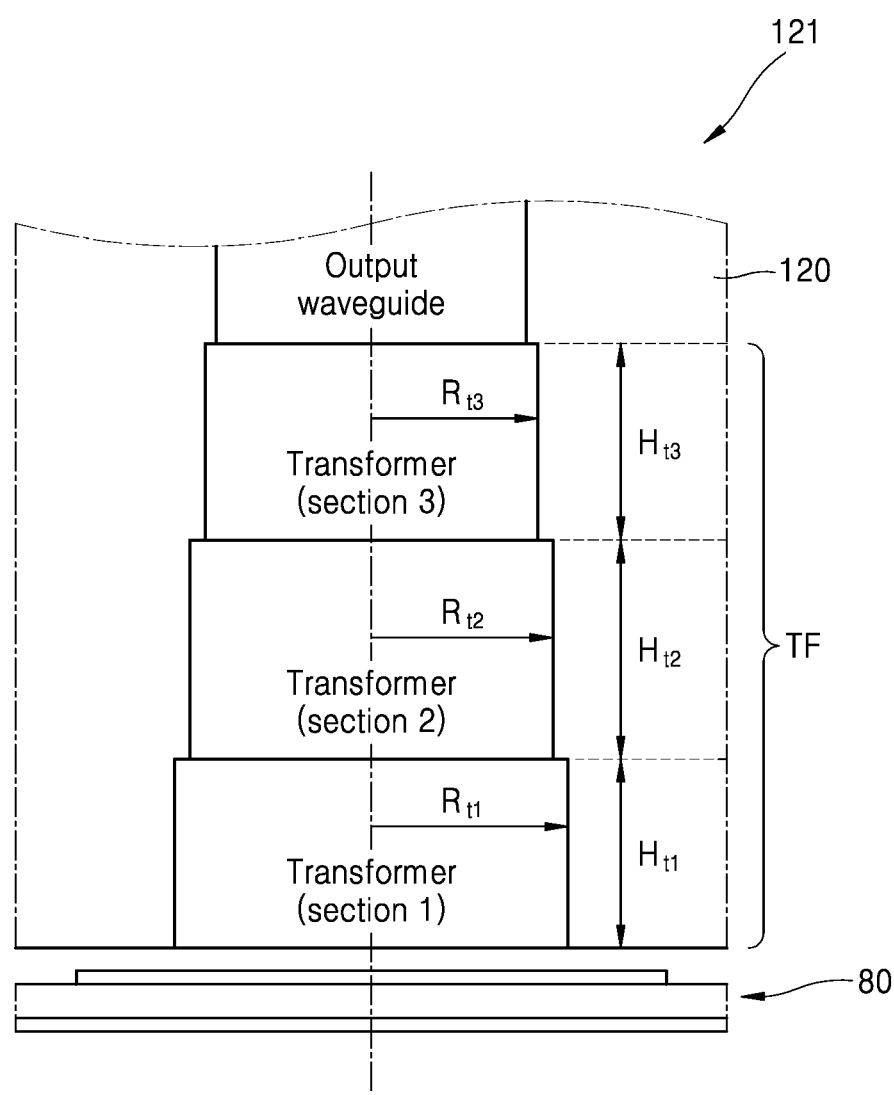
FIG. 11 is a conceptual diagram illustrating a configuration of a metal hollow waveguide included in a rotary-type data transmission device according to an embodiment of the disclosure.

FIG. 11 is a conceptual diagram illustrating a configuration of a metal hollow waveguide included in a rotary-type data transmission device according to an embodiment of the disclosure.

Referring to FIG. 11, a metal hollow waveguide 121 may further include an impedance transformer TF at one end facing the second meta waveguide 80. As illustrated, a transformer of several sections may be provided. The height of each section may be about $\lambda_0/4$, and detailed heights $H_{t1}$, $H_{t2}$, and $H_{t3}$, radiuses $R_{t1}$, $R_{t2}$, and $R_{t3}$, and the number of sections may be suitably determined by considering impedance matching with the second meta waveguide 80.

The impedance transformer TF may also be provided at the other end where the metal hollow waveguide 121 faces the first meta waveguide 20.

Figure 12A:
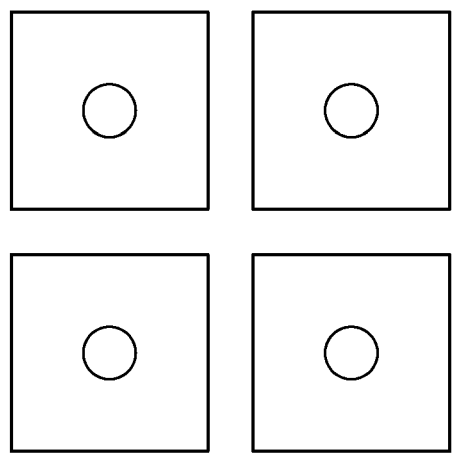
FIGS. 12A, 12B, and 12C are plan views illustrating various shapes of an electromagnetic bandgap structure that may be included in a rotary-type data transmission device according to various embodiments of the disclosure.
Figure 12B:
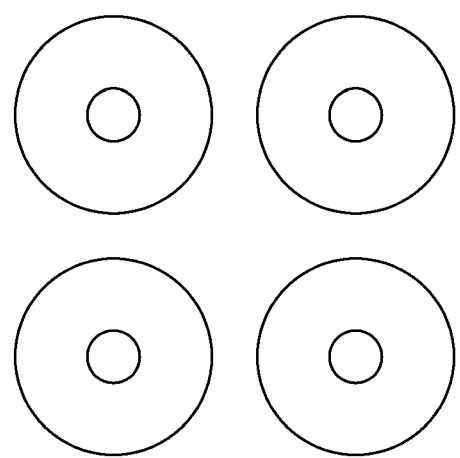
Figure 12C:
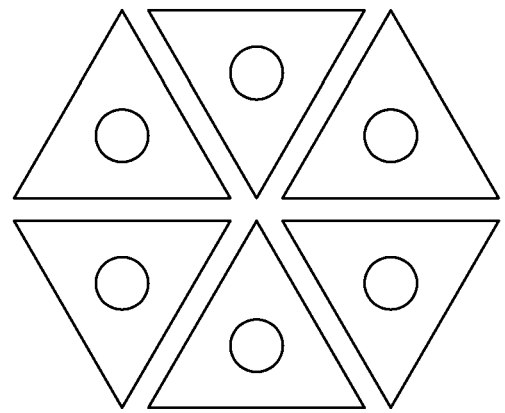

FIGS. 12A, 12B, and 12C are plan views illustrating various shapes of an electromagnetic bandgap structure that may be included in a rotary-type data transmission device according to various embodiments of the disclosure.

Referring to FIGS. 12A, 12B, and 12C, the electromagnetic bandgap structure may have a pad shape, such as a rectangular shape, a circular shape, or a triangular shape, and various other polygonal shapes may also be adopted.

The above data transmission device may have a rotary structure and may be used in various electronic apparatuses because the data transmission device is compact, reliable, and simple and is capable of inexpensive data transmission.

FIGS. 13A, 13B, 13C and 13D illustrate electronic apparatuses to which rotary-type data transmission devices according to embodiments of the disclosure.

Figure 13A:
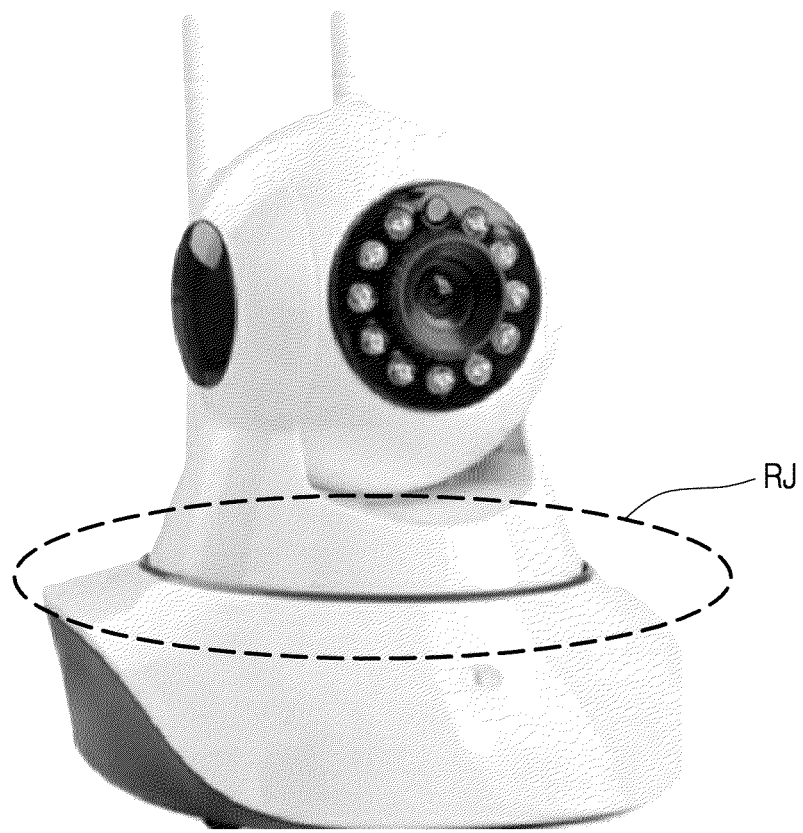
FIGS. 13A, 13B, 13C, and 13D illustrate electronic apparatuses to which rotary-type data transmission devices according to various embodiments of the disclosure.

Referring to FIG. 13A, it illustrates a video system including a rotary camera. The data transmission devices according to the above embodiments may be used in a rotary joint RJ.

Figure 13B:
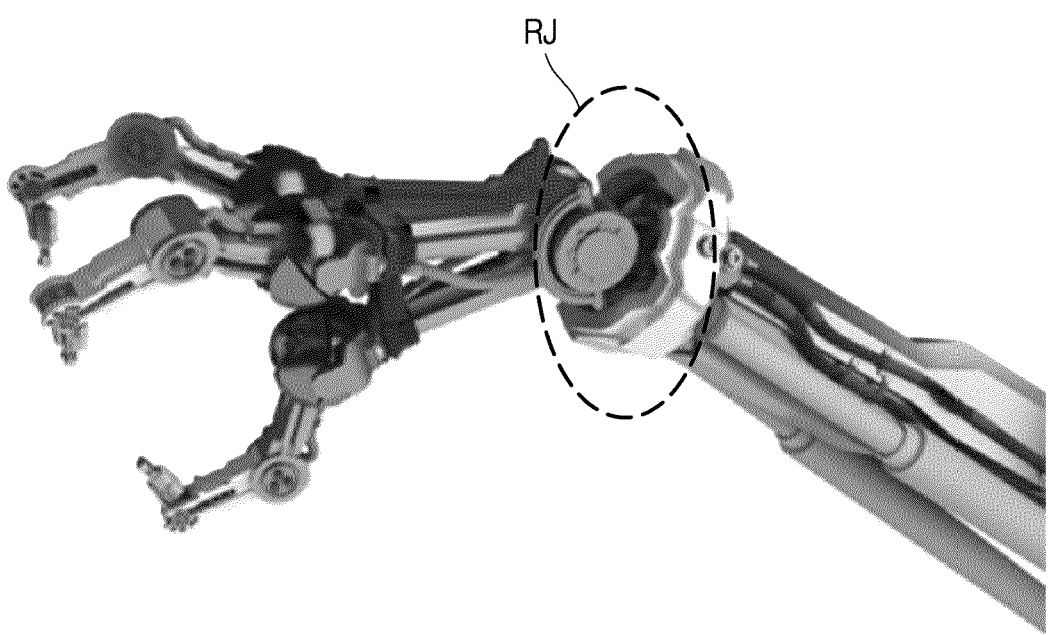
Figure 13C:
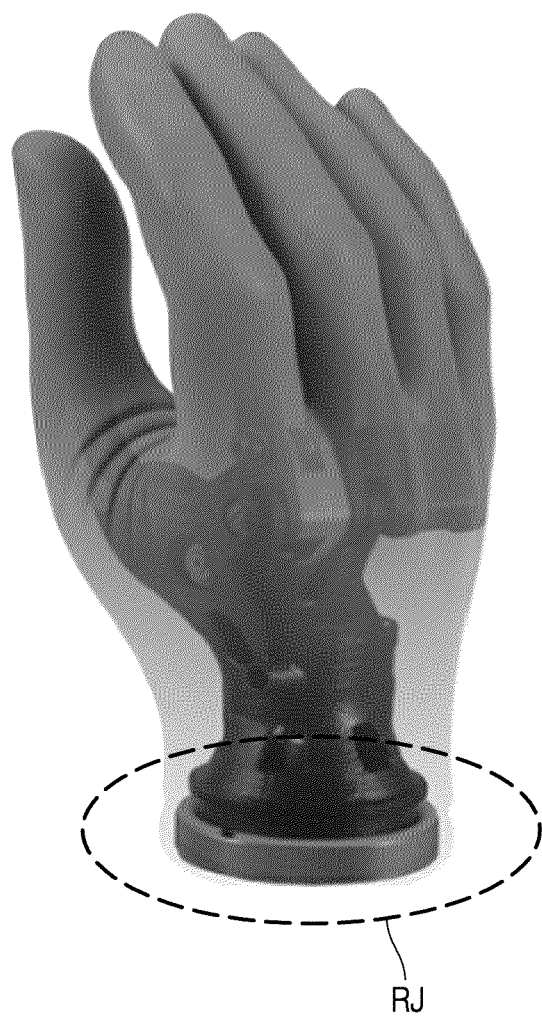
Figure 13D:

Referring to FIGS. 13A, 13B, 13C and 13D, the data transmission devices according to embodiments may be used in a rotary joint RJ of a robot arm of FIG. 13B, a bionic prosthesis of FIG. 13C, or a radar antenna of FIG. 13D.

The embodiments described in various sections of the above description may be combined to achieve advantageous effects even when the possibility of such combinations is not explicitly stated.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A rotary-type data transmission device comprising:
a first structure having a first surface and a second surface facing each other, the first structure including a first metal hollow waveguide including a first through hole passing through the second surface from the first surface in a center portion thereof;
a second structure coupled to the first structure so that the second structure supports rotation of the first structure or rotation of the second structure is supported by the first structure;
a first transceiver unit facing the first surface at a certain distance therebetween, coupled to the first structure, the first transceiver unit including a first printed circuit board, a first meta waveguide, and a first transceiver; and a second transceiver unit facing the second surface at a certain distance therebetween, coupled to the second structure, the second transceiver unit including a second printed circuit board, a second meta waveguide, and a second transceiver.

2. The rotary-type data transmission device of claim 1, wherein a rotation axis on which the first structure or the second structure rotates is aligned with a center axis of the first metal hollow waveguide.

3. The rotary-type data transmission device of claim 2, wherein the first meta waveguide, the first metal hollow waveguide, and the second meta waveguide form a contactless data transmission path between the first transceiver and the second transceiver.

4. The rotary-type data transmission device of claim 1, wherein the first meta waveguide is arranged on a surface facing the first structure among both surfaces of the first printed circuit board, and the first transceiver is arranged on the other surface of the first printed circuit board.

5. The rotary-type data transmission device of claim 1, wherein the second meta waveguide is arranged on a surface facing the first structure among both surfaces of the second printed circuit board, and the second transceiver is arranged on the other surface of the second printed circuit board.

6. The rotary-type data transmission device of claim 1, wherein the first structure also functions as a ground layer with respect to each of the first meta waveguide and the second meta waveguide.

7. The rotary-type data transmission device of claim 1, wherein the first structure includes a first metal flange portion protruding from the second surface toward the second structure and the first through hole of the first metal hollow waveguide extends through the first metal flange portion, wherein the second structure includes a second metal flange portion protruding toward the first structure, wherein a second through hole passing through the second structure and the second metal flange portion is provided to form a second metal hollow waveguide, and wherein the first metal hollow waveguide and the second metal hollow waveguide are flange-coupled free of contact.

8. The rotary-type data transmission device of claim 7, wherein the first structure functions as a ground layer with respect to the first meta waveguide, and wherein the second structure functions as a ground layer with respect to the second meta waveguide.

9. The rotary-type data transmission device of claim 1, wherein at least one of the first meta waveguide or the second meta waveguide includes a ridge gap waveguide including a conductive ridge and a plurality of electromagnetic bandgap structures surrounding the conductive ridge.

10. The rotary-type data transmission device of claim 9, wherein the ridge gap waveguide includes a plurality of equiphase branches extending from the first transceiver or the second transceiver and intersecting in a junction area between the first metal hollow waveguide and the ridge gap waveguide.

11. The rotary-type data transmission device of claim 10, wherein the plurality of equiphase branches have a symmetrical configuration to excite a TM01 mode in the first metal hollow waveguide.

12. The rotary-type data transmission device of claim 10, wherein the plurality of equiphase branches are galvanically connected in the junction area.

13. The rotary-type data transmission device of claim 10, wherein the plurality of equiphase branches are galvanically isolated in the junction area.

14. The rotary-type data transmission device of claim 12, wherein the electromagnetic bandgap structure includes a conductive pad located on an outermost surface of the first printed circuit board or the second printed circuit board, and a via-type base extending from the conductive pad to an internal ground layer of the first printed circuit board or the second printed circuit board.

15. An electronic apparatus comprising the rotary-type data transmission device of claim 1.

* * * * *